(12) United States Patent
Schuerhoff

(10) Patent No.: US 12,188,504 B2
(45) Date of Patent: Jan. 7, 2025

(54) RIVET SLEEVE AND BLIND RIVET WITH A RIVET SLEEVE

(71) Applicant: HELLA GmbH & Co. KGaA, Lippstadt (DE)

(72) Inventor: Konrad Schuerhoff, Rietberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 180 days.

(21) Appl. No.: 17/970,688

(22) Filed: Oct. 21, 2022

(65) Prior Publication Data
US 2023/0037581 A1 Feb. 9, 2023

Related U.S. Application Data

(63) Continuation of application No. PCT/EP2021/059781, filed on Apr. 15, 2021.

(30) Foreign Application Priority Data

Apr. 28, 2020 (DE) .................. 10 2020 111 539.3

(51) Int. Cl.
*F16B 19/10* (2006.01)

(52) U.S. Cl.
CPC .......... *F16B 19/1063* (2013.01); *F16B 19/10* (2013.01)

(58) Field of Classification Search
CPC ........ F16B 5/04; F16B 13/122; F16B 13/126; F16B 13/128; F16B 19/04; F16B 19/10; F16B 19/1045; F16B 19/1054; F16B 19/1063; F16B 19/109; Y10S 411/913
USPC ..... 411/34, 28, 29, 44, 60.1, 80.1, 500–501, 411/507–508, 39
See application file for complete search history.

(56) References Cited

U.S. PATENT DOCUMENTS

| | | | | |
|---|---|---|---|---|
| 4,170,920 A | * | 10/1979 | Siebol | F16B 19/008 411/43 |
| 4,285,265 A | | 8/1981 | Rieper | |
| 4,580,936 A | * | 4/1986 | Francis | F16B 19/008 411/43 |

(Continued)

FOREIGN PATENT DOCUMENTS

| DE | 2831012 A1 | 1/1980 |
|---|---|---|
| DE | 9311997 U1 | 12/1993 |

(Continued)

OTHER PUBLICATIONS

International Search Report dated Jun. 30, 2021 in corresponding application PCT/EP2021/059781.

*Primary Examiner* — Roberta S Delisle

(74) *Attorney, Agent, or Firm* — Muncy, Geissler, Olds & Lowe, P.C.

(57) ABSTRACT

A rivet sleeve of a blind rivet for connecting at least one die-head-side component to a closing-head-side component, the rivet sleeve having a sleeve shank including a sleeve shank end. An elastic sleeve die head is arranged at an end of the sleeve shank opposite the sleeve shank end for ensuring a minimum clamping force between at least the die-head-side component and the closing-head-side component in a closed state of the blind rivet, the sleeve die head. The sleeve die head extend around the sleeve shank radially around the extension axis of the sleeve shank. At least two recesses spaced a distance apart in the lateral surface of the sleeve die head.

9 Claims, 5 Drawing Sheets

(56) References Cited

U.S. PATENT DOCUMENTS

| | | | |
|---|---|---|---|
| 4,726,722 A | | 2/1988 | Wollar |
| 4,781,500 A | * | 11/1988 | Mauer ................. F16B 19/1054 411/36 |
| 4,958,971 A | * | 9/1990 | Lacey ................. F16B 19/1054 411/69 |
| 5,496,140 A | | 3/1996 | Gossmann et al. |
| 5,551,816 A | | 9/1996 | Brewer et al. |
| 5,645,383 A | * | 7/1997 | Williams ............ F16B 19/1054 411/501 |
| 6,254,324 B1 | * | 7/2001 | Smith ................. F16B 19/1045 411/34 |
| 8,371,785 B2 | | 2/2013 | Babej et al. |
| 8,449,234 B2 | * | 5/2013 | Taylor ...................... B21J 15/10 411/39 |
| 8,696,278 B2 | | 4/2014 | Babej et al. |
| 8,911,190 B2 | * | 12/2014 | Saltenberger ....... F16B 19/1054 411/34 |
| 8,985,923 B2 | * | 3/2015 | Jones ................. F16B 19/1054 411/501 |
| 9,267,524 B2 | | 2/2016 | Brewer et al. |
| 9,890,805 B2 | * | 2/2018 | Schneider ................. F16B 5/04 |
| 2014/0271024 A1 | | 9/2014 | Jones |

FOREIGN PATENT DOCUMENTS

| | | |
|---|---|---|
| DE | 29709167 U1 | 7/1997 |
| DE | 202006008721 U1 | 10/2007 |
| DE | 102010002847 A1 | 9/2011 |
| DE | 102015209548 A1 | 11/2016 |
| GB | 2464674 A | 4/2010 |
| JP | H07233808 A | 9/1995 |

* cited by examiner

Section A-A

Fig. 3  Section A-A

RIVET SLEEVE AND BLIND RIVET WITH A RIVET SLEEVE

This nonprovisional application is a continuation of International Application No. PCT/EP2021/059781, which was filed on Apr. 15, 2021, and which claims priority to German Patent Application No. 10 2020 111 539.3, which was filed in Germany on Apr. 28, 2020, and which are both herein incorporated by reference.

BACKGROUND OF THE INVENTION

Field of the Invention

The present invention relates to a rivet sleeve of a blind rivet for connecting at least one die-head-side component to a closing-head-side component, as well as a blind rivet including a rivet sleeve according to the invention.

Description of the Background Art

A blind rivet comprises a rivet sleeve and a rivet mandrel, the rivet sleeve and/or the rivet mandrel being able to be locally deformed to connect components to each other. The blind rivet is closed or "set." The closed blind rivet applies a clamping force to the components, by means of which a reliable and permanent hold is to be ensured for the components. The blind rivet and the components to be connected may have different coefficients of thermal expansion, so that, in the case of a temperature change, they expand to different degrees, it being necessary to always ensure the hold of the components. In headlamps for motor vehicles, positive as well as negative temperature changes may frequently occur. Furthermore, the headlamps must operate properly within a large temperature range, for example between −40° C. and +80° C.

A blind rivet, which includes a sleeve die head designed as a spring seat, is known from DE 102010002847 A1, which corresponds to U.S. 2013/0243542. A blind rivet of this type may disadvantageously establish a clamping force for ensuring a reliable hold of the components only to a limited extent, for example not continuously, since cracks may form in the sleeve die head of the blind rivet, for example in the case of frequent temperature changes. Consequently, this may result in a loss of clamping force, and a minimum clamping force may fall below, which may result in a defocusing as well as a change in position of an element, such as a light source, arranged on a component.

SUMMARY OF THE INVENTION

It is therefore an object of the present invention to at least partially eliminate the disadvantages described above. For example, the object of the present invention is to describe a stable blind rivet and a stable rivet sleeve, for example a continuously stable blind rivet and a continuously stable rivet sleeve.

The aforementioned object is achieved by a rivet sleeve as well as by a blind rivet. Features and details which are described in connection with the rivet sleeve according to the invention also apply, of course, in connection with the blind rivet according to the invention and vice versa in each case, so that reference always is or may be made interchangeably with respect to the disclosure of the individual aspects of the invention.

The present invention shows, in an example, a rivet sleeve of a blind rivet for connecting at least one die-head-side component to a closing-head-side component. The rivet sleeve according to the invention comprises a sleeve shank having a sleeve shank end, the sleeve shank end of the rivet sleeve being deformed into a closing head in a closed state of the blind rivet, and the closing head being arranged on an upper side of the closing-head-side component. The rivet sleeve further comprises an elastic sleeve die head arranged at an end of the sleeve shank opposite the sleeve shank end for ensuring a minimum clamping force between at least the die-head-side component and the closing-head-side component in the closed state of the blind rivet. The sleeve die head is also arranged on an upper side of the die-head-side component opposite the upper side of the closing-head-side component in the closed state. Moreover, the sleeve die head extends around the sleeve shank radially around the extension axis of the sleeve shank, and the sleeve die head also has at least two recesses spaced a distance apart in the lateral surface of the sleeve die head.

The blind rivet according to the invention is, for example, for a headlamp of a motor vehicle. The rivet sleeve or the blind rivet, which has the at least two recesses spaced a distance apart in the lateral surface of the sleeve die head, is advantageously particularly stable in the closed state. For example, the rivet sleeve or the blind rivet is stable over a large temperature range, for example from −40° C. to +80° C., and may furthermore withstand frequent temperature changes without a loss of its elastic properties. The occurrence of cracks in the sleeve die head of the rivet sleeve in the closed state, due to frequent positive as well as negative temperature changes and/or due to a large temperature range to which the rivet sleeve is exposed, may be mitigated, for example prevented entirely. This makes it possible to establish that the minimum clamping force between at least the die-head-side component and the closing-head-side component is ensured over a long period of time, for example continuously. A defocusing as well as a change in position of an element, such as a light source or a reflector, arranged on a die-head side or closing-head side component, may thus be kept particularly low, preferably avoided.

The rivet sleeve may be made from a metal. The metal may be stainless steel, preferably aluminum.

The sleeve shank or the rivet sleeve is furthermore provided with an, for example, rotationally symmetrical, preferably tubular, design. The sleeve shank, for example the tubular sleeve shank, may advantageously guide a rivet mandrel. Moreover, the tubular sleeve shank may have a constant wall thickness, for example an essentially constant wall thickness. The sleeve shank end of the sleeve shank is also, for example, a part of the sleeve shank at the end of the sleeve shank facing away from the die-head-side component. This part, for example the tubular part, of the sleeve shank may be deformed into the closing head. The closing head may preferably extend around the sleeve shank radially around the extension axis of the sleeve shank; for example, the closing head may be provided with a mushroom-shaped, preferably umbrella-shaped, design, or it may have been deformed into a mushroom-shaped, preferably umbrella-shaped, closing head. The blind rivet or the rivet sleeve may thus be particularly stable. The extension axis of the sleeve shank is preferably the longitudinal center axis of the sleeve shank. The extension axis of a rotationally symmetrical sleeve shank may furthermore be the rotation axis.

The closed state of the blind rivet is, for example, a state of the blind rivet after the closing or "setting" of the blind rivet. In the closed state, at least the die-head-side component and the closing-head-side component are connected to each other in such a way that the minimum clamping force between the at least two components is ensured. The connection of at least the die-head-side component and the closing-head-side component is furthermore preferably a force-fitting and/or form-fitting connection.

The sleeve die head and the sleeve shank are preferably provided with a one-piece design, so that together they may form a particularly stable rivet sleeve. For example, the sleeve die head is also arranged on the outer lateral surface of the end of the sleeve shank opposite the sleeve shank end. The elastic sleeve die head may particularly preferably change its shape under the application of force and return to its original shape after the cessation of force. In other words, in a closed state of the blind rivet, the sleeve die head may, for example, deform elastically under the application of force in such a way that no plastic deformation occurs in the sleeve die head. In addition, the sleeve die head may have a constant wall thickness, at least in sections, for example an essentially constant wall thickness, at least in sections. For example, the sleeve die head has a constant wall thickness, for example an essentially constant wall thickness, in the sections in which the sleeve die head does not have any recesses. The blind rivet or the rivet sleeve may thus be particularly stable. Moreover, the sleeve die head may have a die head underside facing the die-head-side component, including at least one die head contact section for arrangement on the upper side of the die-head-side component. The die head contact section preferably extends radially, for example in a radially circumferential manner, around the extension axis of the sleeve shank.

The at least two recesses spaced a distance apart in the lateral surface of the sleeve die head are, for example, a multiplicity of recesses spaced a distance apart in the lateral surface of the sleeve die head. The flux of force in the sleeve die head may thus be particularly uniform in the closed state of the blind rivet. The at least two recesses spaced a distance apart in the lateral surface of the sleeve die head are also preferable all provided with the same design.

The phrase, "in the lateral surface" is intended to express, for example, that the lateral surface or the shape of the lateral surface of the sleeve die head is changed by the at least two recesses spaced a distance apart, in each case in the region of the at least two recesses spaced a distance apart. For example, the lateral surface of the sleeve die head may be enlarged by the at least two recesses spaced a distance apart.

It may be advantageous if the sleeve die head in a rivet sleeve according to the invention is provided with a rotationally symmetrical design. In other words, the sleeve die head may be projected onto itself, for example, by rotating around the extension axis of the sleeve shank around a certain angle. The rotation axis of the sleeve die head and the extension axis of the sleeve shank preferably coincide with each other. As a result, a force may particularly advantageously flow within the sleeve die head in the closed state of the blind rivet, and the blind rivet or the rivet sleeve may thus be particularly stable. For example, the sleeve die head may be provided with a mushroom-shaped, preferably umbrella-shaped, design. The umbrella-shaped sleeve die head may particularly advantageously change its shape under the application of force and return to its original shape after the cessation of force.

The sleeve die head in a rivet sleeve according to the invention may advantageously have an inner lateral surface facing the sleeve shank and an outer lateral surface facing away from the sleeve shank, the at least two recesses being formed in the inner lateral surface and/or in the outer lateral surface of the sleeve die head. In other words, the at least two recesses may be formed on the die head underside and/or on a die head upper side of the sleeve die head opposite the die head underside. Furthermore, the outer lateral surface and the inner lateral surface of the sleeve die head may form at least one part of the lateral surface of the sleeve die head. The outer lateral surface and the inner lateral surface of an umbrella-shaped sleeve die head may each essentially have the shape of the lateral surface of a sphere segment. The at least two recesses are preferably formed in the inner lateral surface of the sleeve die head. As a result, a force may particularly advantageously flow within the sleeve die head in the closed state of the blind rivet, and a crack formation may be better prevented, preferably prevented entirely.

The at least two recesses in a rivet sleeve according to the invention may particularly advantageously be arranged radially around the extension axis of the sleeve shank, for example, radially around the rotation axis of the sleeve die head, at equal, for example essentially equal, distances from each other. In other words, two adjacent recesses of the at least two recesses may be spaced equidistantly apart in the sleeve die head. The blind rivet or the rivet sleeve may thus be particularly stable, and a force may particularly advantageously flow within the sleeve die head. If the sleeve die head has, for example, four recesses spaced a distance apart in the lateral surface of the sleeve die head, the four recesses are arranged in the lateral surface at equal angular distances from each other, i.e., 90° radially around the extension of the sleeve shank. The at least two recesses arranged radially around the extension axis of the sleeve shank, for example radially around the rotation axis of the sleeve die head, are advantageously situated equidistantly from the extension axis of the sleeve shank. A sleeve die head of this type may thus be, for example, rotationally symmetrical. As a result, the flux of force in the sleeve die head may be particularly advantageous, and the blind rivet or the rivet sleeve may be particularly stable in the closed state.

The at least two recesses in a rivet sleeve according to the invention may be situated equidistantly from the extension axis of the sleeve shank. In other words, the particular distance of the at least two recesses from the extension axis of the sleeve shank may be the same. A blind rivet of this type or a rivet sleeve of this type is advantageously particularly easy to manufacture and may be particularly stable at the same time. It is also conceivable that the at least two recesses are not equidistant from the extension axis of the sleeve shank. This means that the at least two recesses may be arranged offset from each other. In other words, the particular distance, for example radial distance, of the at least two recesses from the extension axis of the sleeve shank varies. The sleeve die head may preferably have a multiplicity of recesses spaced a distance apart in the lateral surface of the sleeve die head. The multiplicity of recesses spaced a distance apart may be arranged radially around the extension axis of the sleeve shank, for example at equal angular distances from each other, two adjacent recesses in each case being arranged offset from each other. For example, the recesses, spaced a distance apart, of the multiplicity of recesses may also be arranged on at least two circular paths running radially around the extension direction of the sleeve shank. The density of recesses in the sleeve die head, i.e., the number of recesses per lateral surface of the sleeve die head, may be particularly high, and the flux of force in the sleeve die head may be particularly advantageous in the closed state of the blind rivet. The blind rivet or the rivet sleeve may thus advantageously be particularly stable in the closed state. The occurrence of crack in the sleeve die head of the rivet sleeve in the closed state may thus be prevented.

It may be advantageous if at least one recess of the at least two recesses in the rivet sleeve according to the invention is preferably an indentation, for example a calotte-like indentation, in the sleeve die head.

The at least two recesses may each be an indentation. The indentation may be a depression. The indentation is furthermore designed, for example, in such a way that it does not break through the sleeve die head. The indentation may be, for example, a targeted material weakness of the sleeve die head, the sleeve die head preferably having a constant wall thickness or material thickness, for example an essentially constant wall thickness or material thickness, in sections in which the sleeve die head does not have any recesses. The indentation is preferably a calotte-like indentation. The calotte-like indentation may have a shape resembling a sphere segment. A blind rivet or a rivet sleeve having an indentations of this type as a recess may be particularly stable in the closed state of the blind rivet.

It may be advantageous if at least one recess of the at least two recesses in a rivet sleeve according to the invention may have or preferably be an opening, for example a slit, in the sleeve die head. For example, the at least two recesses are an opening in each case. The opening may be formed, for example, by an inner lateral surface facing the sleeve shank in the direction of an outer lateral surface of the sleeve die head facing away from the sleeve shank. In other words, the opening breaks through the sleeve die head, the opening further extending in a direction radially away from the sleeve shank, i.e., having an elongated shape. The elongated opening may be, for example, a slit. The flux of force in the sleeve die head having an elongated opening may be particularly advantageous, and the blind rivet or the rivet sleeve may be particularly stable in the closed state. The opening may furthermore be a bore hole. The bore hole as the opening may be implemented particularly easily.

The at least two recesses in a rivet sleeve according to the invention may be particularly advantageous formed in a region of at least one die head contact section of the sleeve die head for arrangement on the upper side of the die-head-side component with respect to the sleeve shank; for example, the at least two recesses may be formed in a region between the at least one die head contact section of the sleeve die head and the sleeve shank. The at least two recesses are preferably each formed at a distance from the sleeve shank and/or at a distance from the at least one die head contact section in each case. A particularly advantageous die head contact section running radially around the sleeve shank may be formed thereby. It is also conceivable that the at least two recesses are each formed at a distance from the sleeve shank, and the at least two recesses each also extend in a direction, preferably in a straight line, radially away from the sleeve shank, for example away from the extension axis of the sleeve shank, up to an outer end of the die head contact section. In other words, a radially circumferential die head contact section may also have the recesses, for example at least in part. A particularly advantageous die head contact section running radially around the sleeve shank and being partially interrupted may be formed thereby.

Further, in a rivet sleeve according to the invention, at least two recesses spaced a distance apart may be formed in the lateral surface of the sleeve shank, for example in the outer lateral surface and/or in the inner lateral surface, at the sleeve shank end. The sleeve shank end of the rivet sleeve may thus have a particularly stable closing head in the closed state of the blind rivet. The closing head may have, for example, the at least two recesses spaced a distance apart in a lateral surface of the closing head, for example the inner lateral surface and/or the outer lateral surface of the closing head. As a result, the flux of force in the blind rivet or the rivet sleeve, for example the sleeve die head, may be particularly advantageous, and the blind rivet or the rivet sleeve may be particularly stable in the closed state. The at least two recesses spaced a distance apart in the lateral surface of the sleeve shank, for example in the outer lateral surface and/or in the inner lateral surface of the sleeve shank, may be indentations, for example calotte-like indentations, and/or openings. In addition, the at least two recesses spaced a distance apart may be arranged in the lateral surface, for example the outer lateral surface, of the sleeve shank, radially around the extension axis of the sleeve shank at the same angular distances from each other. The at least two recesses may furthermore be arranged equidistantly from the extension axis of the sleeve shank in the lateral surface, for example the outer lateral surface, of the sleeve shank.

Also, the present invention shows a blind rivet for connecting at least one die-head-side component to a closing-head-side component. The blind rivet furthermore comprises a rivet sleeve according to the invention as well as a rivet mandrel at least partially arranged in the rivet sleeve, including a mandrel shank and a mandrel head at one end of the mandrel shank, the rivet mandrel being designed to deform the sleeve shank end of the rivet sleeve into the closing head when the rivet mandrel moves in a direction from the sleeve shank end to the sleeve die head of the rivet sleeve.

In a blind rivet according to the invention, a separate, spring-mounted element may be additionally arranged between the closing head of the rivet sleeve and an upper side of the closing-head-side component in a closed state of the blind rivet. The spring-mounted element may be a spring washer or a lock washer.

The blind rivet according to the second aspect of the invention therefore has the same advantages as already described in relation to the rivet sleeve according to the first aspect of the invention.

Other measures which improve the invention are derived from the following description of a number of exemplary embodiments of the invention, which are illustrated schematically in the figures. All features and/or advantages arising from the claims, the description, or the drawings, including structural details, spatial arrangements and method steps, may be essential to the invention individually as well as in the different combinations. It should be noted that the figures are only descriptive in nature and are not intended to limit the invention in any way.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
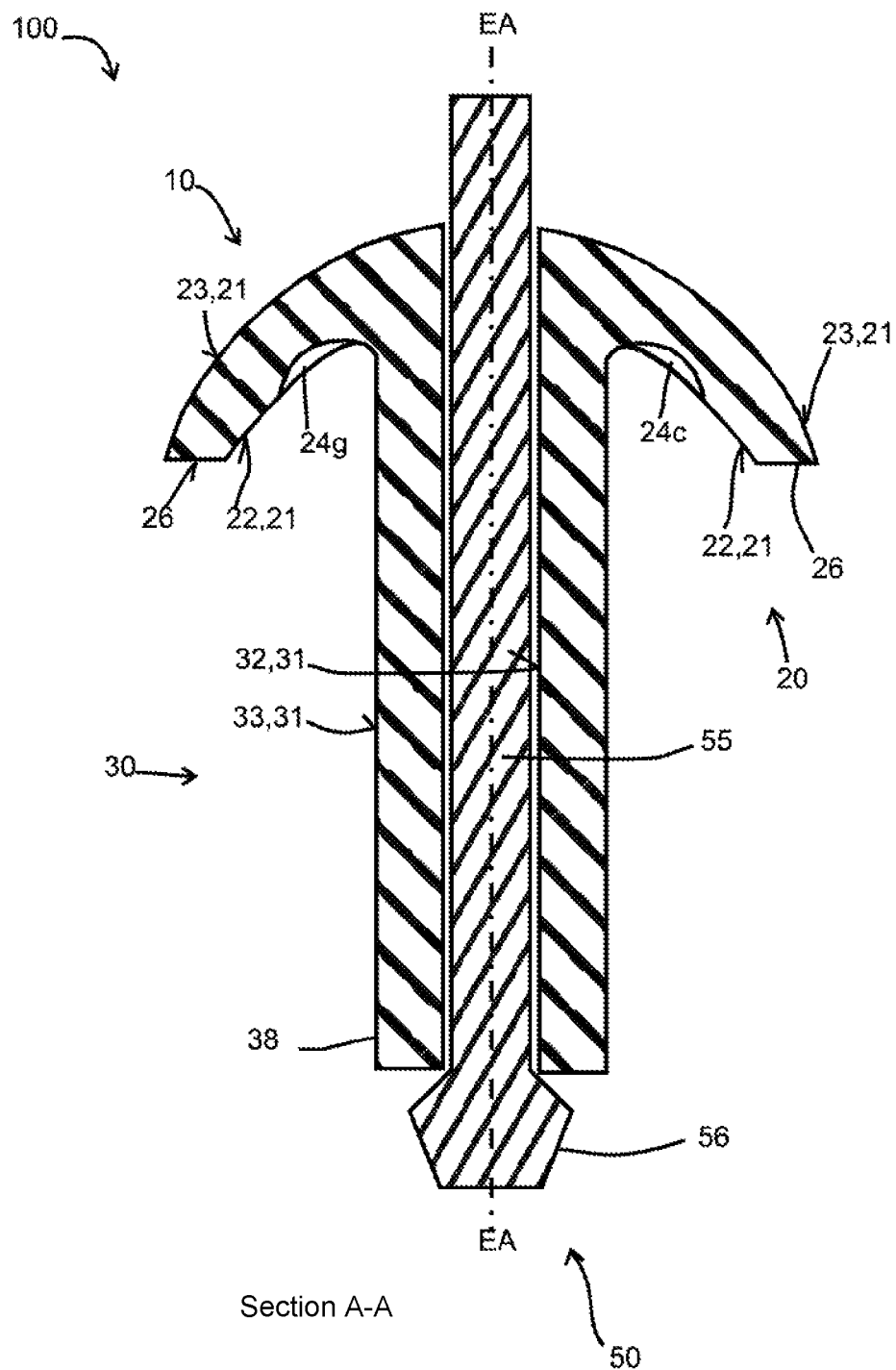
FIG. 1 shows an example of a blind rivet according to the invention or a rivet sleeve in a non-closed state in a vertical sectional view.
Figure 2:
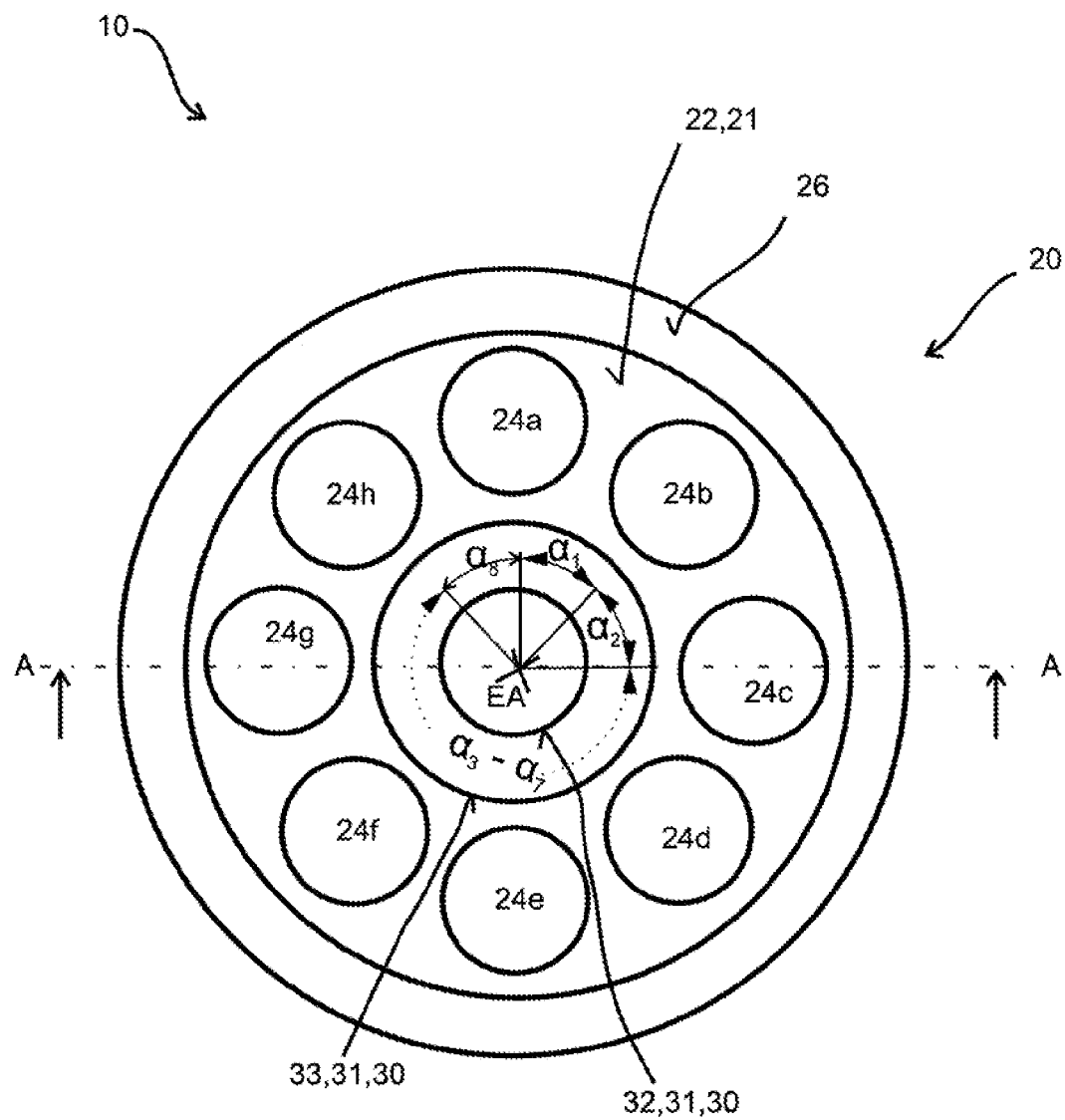
FIG. 2 shows the rivet sleeve from FIG. 1 in a view from below.
Figure 3:
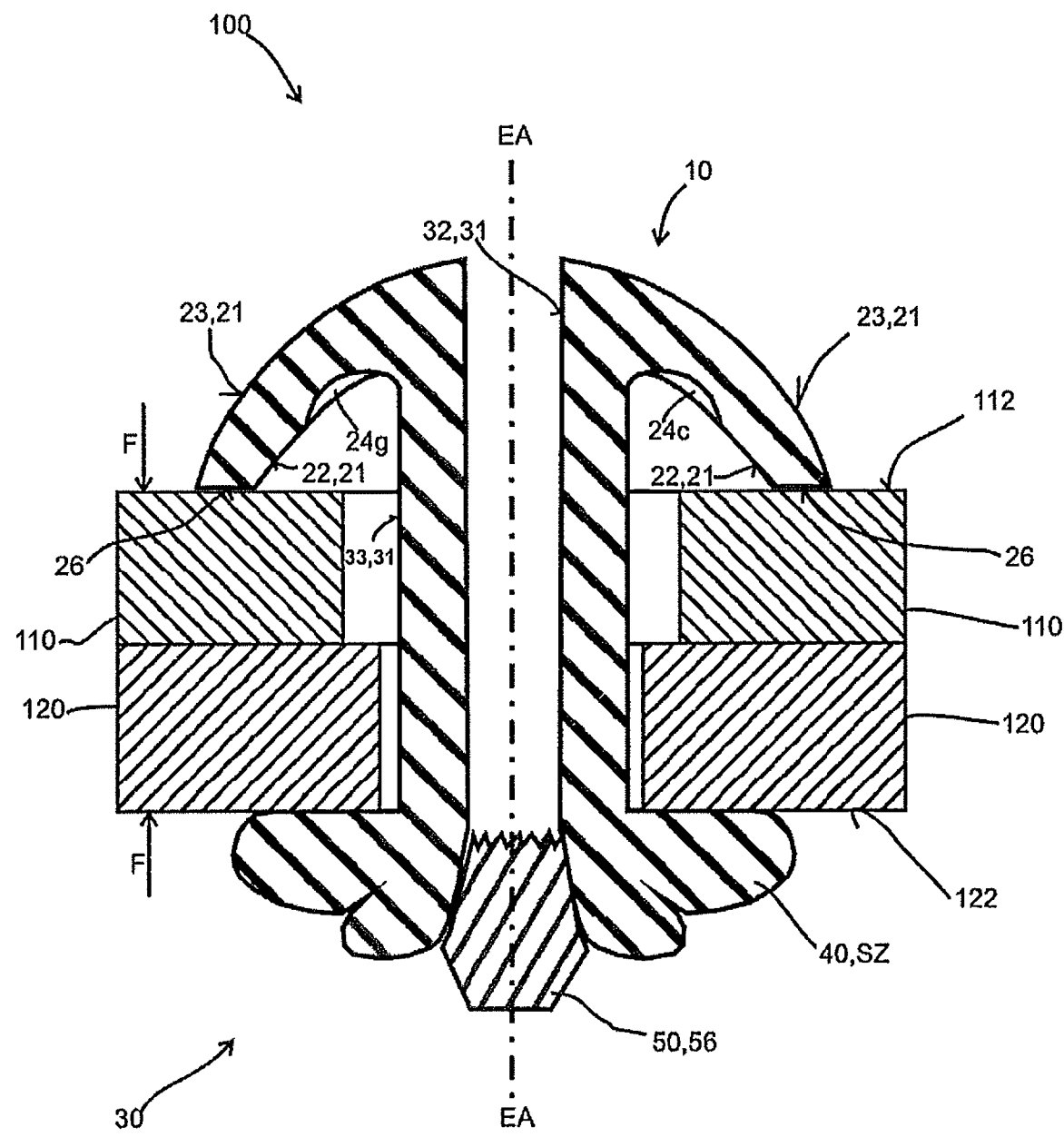
FIG. 3 shows the blind rivet according to the invention or the rivet sleeve from FIG. 1 in the closed state in a vertical sectional view.

FIGS. 1 through 3 show an example of a blind rivet 100, including a rivet sleeve 10 according to the invention and a rivet mandrel 50. In FIG. 1 and FIG. 3, blind rivet 100 is illustrated in a vertical sectional view in each case (cf. section A-A in FIG. 2). FIG. 2 shows rivet sleeve 10 of this specific embodiment in a view from below.

FIG. 1 discloses rivet sleeve 10 according to the invention in a non-set or non-closed state. In this case, rivet sleeve 10 comprises a sleeve shank 30, which has a sleeve shank end 38 and an elastic sleeve die head 20 arranged on the end of sleeve shank 30 opposite sleeve shank end 38 for ensuring a minimum clamping force F between a die-head-side component 110 and a closing-head-side component 120 in a closed state SZ of blind rivet 100 (cf. FIG. 3). Sleeve die head 20 has a radially circumferential die head contact section 26, which is arranged on an upper side 112 of die-head-side component 110 opposite upper side 122 of closing-head-side component 120 in closed state SZ (cf. FIG. 3). Sleeve shank 30 guides a rivet mandrel 50 along extension axis EA of sleeve shank 30, rivet mandrel 50 comprising a mandrel shank 55 and a mandrel head 56. Moreover, the sleeve shank 30 has an essentially constant wall thickness or material thickness and is provided with a tubular design. Sleeve shank end 38 of sleeve shank 30, for example a portion of sleeve shank 30, on sleeve shank end 38 may be deformed into closing head 40 (see FIG. 3). Sleeve die head 20 extends around sleeve shank 30 radially around extension axis EA of sleeve shank 30. In this specific embodiment, sleeve die head 20 is provided with an umbrella-shaped design and has an inner lateral surface 22 and an outer lateral surface 23, recesses 24g and 24c of recesses 24a through 24h (cf. FIG. 2), which are spaced a distance apart in inner lateral surface 22 of lateral surface 21 of sleeve die head 20, being visible. Recesses 24a through 24h in this case are calotte-shaped, i.e. calotte-like, indentations.

As is apparent from FIG. 2, in this exemplary embodiment, sleeve die head 20 of rivet sleeve 10 has eight calotte-shaped indentations as recesses 24a through 24h, sleeve die head 20 also being provided with a rotationally symmetrical design. The calotte-shaped indentations are arranged radially around extension axis EA of sleeve shank 30 at the same angular distances $\alpha_1$ through $\alpha_8$ (only $\alpha_1$, $\alpha_2$ and $\alpha_8$ being shown here for the sake of clarity), recesses 24a through 24h furthermore being equidistant from extension axis EA of sleeve shank 30 in each case. As a result, a flux of force in sleeve die head 20 may be particularly advantageous, and blind rivet 100 or rivet sleeve 10 may be particularly stable in closed state SZ (cf. FIG. 3).

FIG. 3 discloses rivet sleeve 10 according to the invention in a set or closed state, i.e., in closed state SZ. In closed state SZ of blind rivet 100, sleeve shank end 38 of rivet sleeve 10 is deformed into closing head 40, closing head 40 being arranged on an upper side 122 of closing-head-side component 120. Mandrel head 56 of rivet mandrel 50 has deformed sleeve shank end 38 of rivet sleeve 10 (cf. FIG. 1) into closing head 40 during the movement of rivet mandrel 50 in a direction from sleeve shank end 38 to sleeve die head 20 of rivet sleeve 10. Mandrel shank 55 is broken off mandrel head 56, and mandrel head 56 closes sleeve shank 30. Elastic sleeve die head 20 arranged on the end of sleeve shank 30 opposite sleeve shank end 38 also ensures minimum clamping force F between die-head-side component 110 and closing-head-side component 120 in closed state SZ of blind rivet 100.

Figure 4:
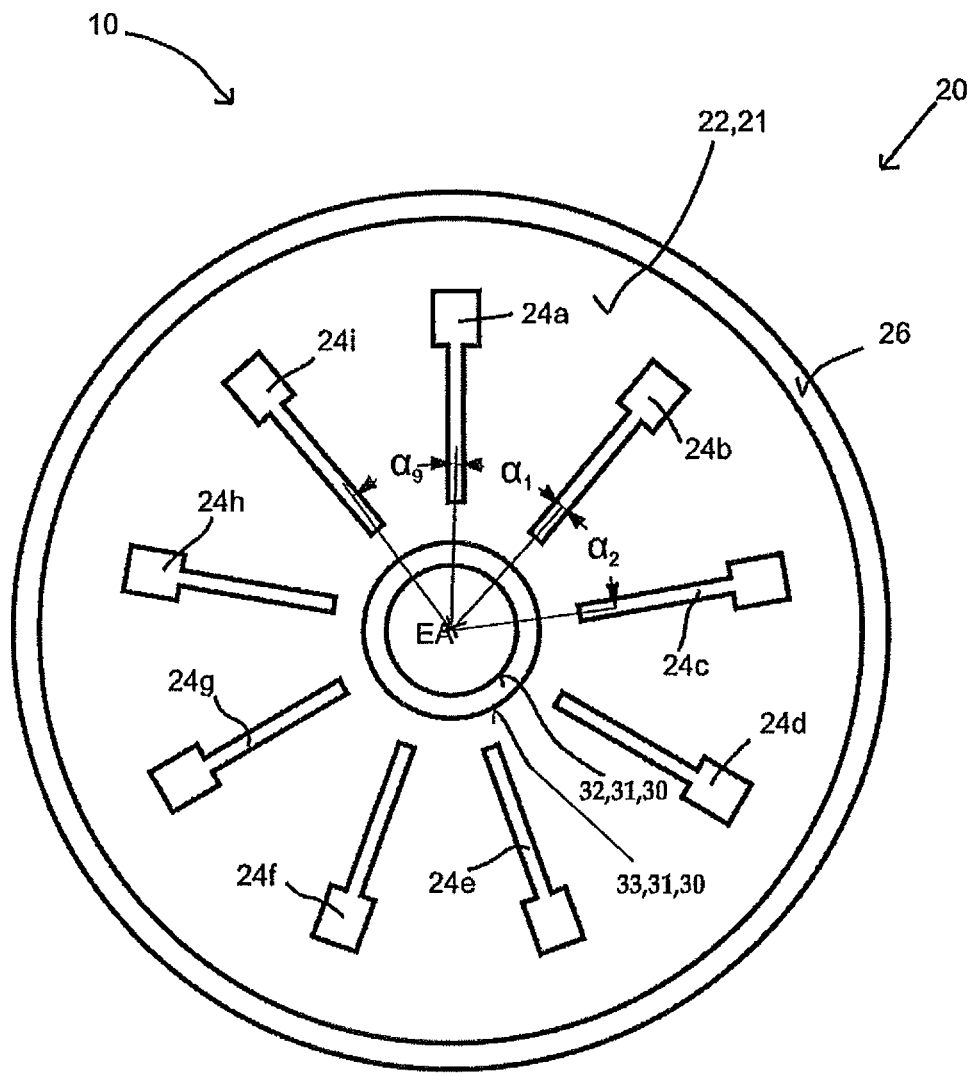
FIG. 4 shows an example of a rivet sleeve according to the invention in a view from below.

FIG. 4 shows a further example of a rivet sleeve 10 in a view from below. Sleeve die head 20 is provided with an umbrella-shaped design (cf. FIG. 1) and has an inner lateral surface 22 and a die head contact section 26 running radially around an extension axis EA of sleeve shank 30 for arrangement on an upper side 112 of a die-head-side component 110. Sleeve die head 20 has nine recesses 24a through 24i, the latter being designed as openings, for example as slits. Recesses 24a through 24i designed as openings each break through sleeve die head 20. The openings are also arranged radially around extension axis EA of sleeve shank 30 at the same angular distances $\alpha_1$ through $\alpha_9$ (only $\alpha_1$ $\alpha_{02}$ and $\alpha_9$ being shown here for the sake of clarity), recesses 24a through 24i furthermore being each equidistant from extension axis EA of sleeve shank 30. Recesses 24a through 24i also each extend in a direction radially away from sleeve shank 30. As illustrated in FIG. 4, it is conceivable that the openings have, for example, a varying opening width. A blind rivet 100 or a rivet sleeve 10 may thus be particularly stable. In FIG. 4, recesses 24a through 24i are furthermore formed in a region between die head contact section 26 of sleeve die head 20 and sleeve shank 30, recesses 24a through 24i each being spaced a distance apart from sleeve shank 30. It would also be conceivable that recesses 24a through 24i are each formed from die head contact section 26 in the direction of sleeve shank 30, i.e., particular recesses 24a through 24i would also be formed in die head contact section 26.

Figure 5:
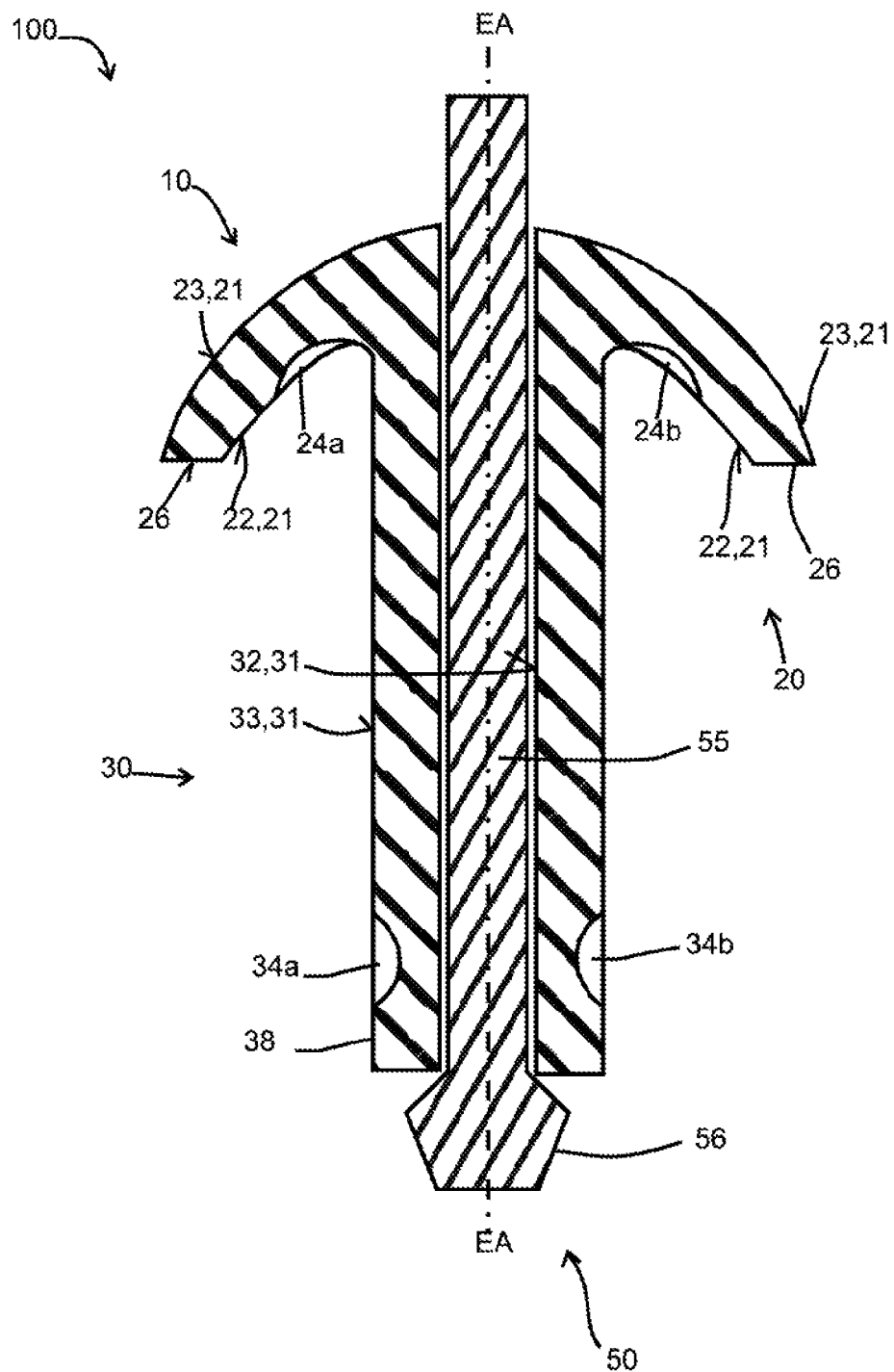
FIG. 5 shows an example of a blind rivet according to the invention or a rivet sleeve in a non-closed state in a vertical sectional view.

FIG. 5 shows a further example of a blind rivet 100 or a rivet sleeve 10 in a vertical sectional view. Blind rivet 100 essentially has the same structure as blind rivet 100 from FIG. 1. In addition, at least two recesses 34a and 34b spaced a distance apart are formed in outer lateral surface 33 on sleeve shank end 38. Sleeve shank end 38 of rivet sleeve 10 may thus have a particularly stable closing head 40 in closed state SZ of blind rivet 100. As a result, the flux of force in blind rivet 100 or rivet sleeve 10, for example sleeve die head 20, may also be particularly advantageous, and blind rivet 100 or rivet sleeve 10 may be particularly stable in closed state SZ. In FIG. 5, recesses 34a and 34b are each designed as a calotte-like indentation.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A rivet sleeve of a blind rivet to connect at least one die-head- side component to a closing-head-side component, the rivet sleeve comprising:
a sleeve shank having a sleeve shank end, the sleeve shank end of the rivet sleeve being deformed into a closing head in a closed state of the blind rivet, the closing head being arranged on an upper side of the closing-head-side component;
an elastic sleeve die head arranged on an end of the sleeve shank opposite the sleeve shank end for ensuring a minimum clamping force between at least the die-head-side component and the closing-head-side component in the closed state of the blind rivet,
wherein the sleeve die head is arranged on an upper side of the die-head-side component opposite the upper side of the closing-head-side component,
wherein the sleeve die head extends around the sleeve shank, such that the sleeve die head extends radially around an extension axis of the sleeve shank,
wherein the sleeve die head has at least two recesses spaced a distance apart in a lateral surface of the sleeve die head, and
wherein the at least two recesses are formed in a region of at least one die head contact section of the sleeve die head for arrangement on the upper side of the die-head-side component with respect to the sleeve shank or wherein the at least two recesses are formed in a region between the at least one die head contact section of the sleeve die head and the sleeve shank.

2. The rivet sleeve according to claim 1, wherein the sleeve die head is provided with a rotationally symmetrical design.

3. The rivet sleeve according to claim 1, wherein the lateral surface of the sleeve die head has an inner lateral surface facing the sleeve shank and an outer lateral surface facing away from the sleeve shank, the at least two recesses being formed in at least one of the inner lateral surface or the outer lateral surface of the sleeve die head.

4. The rivet sleeve according to claim 1, wherein the at least two recesses are arranged radially around the extension axis of the sleeve shank at equal angular distances from each other.

5. The rivet sleeve according to claim 1, wherein the at least two recesses are equidistant from the extension axis of the sleeve shank.

6. The rivet sleeve according to claim 1, wherein at least one recess of the at least two recesses is an indentation or a calotte shaped indentation in the sleeve die head.

7. A blind rivet to connect at least one die-head-side component to a closing-head-side component, the blind rivet comprising:
a rivet sleeve according to claim 1; and
a rivet mandrel that is at least partially arranged in the rivet sleeve and includes a mandrel shank and a mandrel head at one end of the mandrel shank, the rivet mandrel being designed to deform the sleeve shank end of the rivet sleeve into the closing head during a movement of the rivet mandrel in a direction from the sleeve shank end to the sleeve die head of the rivet sleeve.

8. A rivet sleeve of a blind rivet to connect at least one die-head-side component to a closing-head-side component, the rivet sleeve comprising;
a sleeve shank having a sleeve shank end, the sleeve shank end of the rivet sleeve being deformed into a closing head in a closed state of the blind rivet, the closing head being arranged on an upper side of the closing-head-side component;
an elastic sleeve die head arranged on an end of the sleeve shank opposite the sleeve shank end for ensuring a minimum clamping force between at least the die-head-side component and the closing-head-side component in the closed state of the blind rivet,
wherein the sleeve die head is arranged on an upper side of the die-head-side component opposite the upper side of the closing-head-side component,
wherein the sleeve die head extends around the sleeve shank, such that the sleeve die head extends radially around an extension axis of the sleeve shank,
wherein the sleeve die head has at least two recesses spaced a distance apart in a lateral surface of the sleeve die head, and
wherein at least one recess of the at least two recesses is an opening or a slit in the sleeve die head.

9. A rivet sleeve of a blind rivet to connect at least one die-head-side component to a closing-head-side component, the rivet sleeve comprising:
a sleeve shank having a sleeve shank end, the sleeve shank end of the rivet sleeve being deformed into a closing head in a closed state of the blind rivet, the closing head being arranged on an upper side of the closing-head-side component;
an elastic sleeve die head arranged on an end of the sleeve shank opposite the sleeve shank end for ensuring a minimum clamping force between at least the die-head-side component and the closing-head-side component in the closed state of the blind rivet,
wherein the sleeve die head is arranged on an upper side of the die-head-side component opposite the upper side of the closing-head-side component,
wherein the sleeve die head extends around the sleeve shank, such that the sleeve die head extends radially around an extension axis of the sleeve shank,
wherein the sleeve die head has at least two recesses spaced a distance apart in a lateral surface of the sleeve die head, and
wherein the sleeve shank has at least two additional recesses spaced a distance apart and being formed in at least one of an inner lateral surface or an outer later surface of the sleeve shank on the sleeve shank end.

* * * * *